US012604247B2

(12) United States Patent
Natarajan et al.

(10) Patent No.: US 12,604,247 B2
(45) Date of Patent: Apr. 14, 2026

(54) METHOD, APPARATUS AND COMPUTER PROGRAM FOR INDICATING THAT A SOURCE ACCESS NODE CONNECTED TO THE FIRST PUBLIC LAND MOBILE NETWORK AND A TARGET ACCESS NODE CONNECTED TO THE SECOND PUBLIC LAND MOBILE NETWORK AREA SAME ACCESS NODE

(71) Applicant: Nokia Technologies Oy, Espoo (FI)

(72) Inventors: Rajesh Babu Natarajan, Bangalore (IN); Subramanya Chandrashekar, Bangalore (IN); Srinivasan Selvaganapathy, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 541 days.

(21) Appl. No.: 18/166,908

(22) Filed: Feb. 9, 2023

(65) Prior Publication Data

US 2023/0269642 A1    Aug. 24, 2023

(30) Foreign Application Priority Data

Feb. 12, 2022    (IN) .............................. 202241007523

(51) Int. Cl.
*H04W 36/08*    (2009.01)
*H04W 36/00*    (2009.01)
*H04W 84/04*    (2009.01)

(52) U.S. Cl.
CPC ....... *H04W 36/08* (2013.01); *H04W 36/0033* (2013.01); *H04W 84/042* (2013.01)

(58) Field of Classification Search
CPC ............. H04W 36/08; H04W 36/0033; H04W 84/042; H04W 36/32; H04W 48/04;
(Continued)

(56) References Cited

U.S. PATENT DOCUMENTS

2018/0309575 A1* 10/2018 Nair ...................... H04L 9/3226
2021/0385283 A1* 12/2021 Talebi Fard .......... H04W 76/10

FOREIGN PATENT DOCUMENTS

WO    2021/180170 A1    9/2021
WO    2021/234635 A1    11/2021
WO    2021/260670 A1    12/2021

OTHER PUBLICATIONS

ETSI TS 123 502 V15.15.0 (Sep. 21) "Procedures for the 5G System", published in September of 2021. (Year: 2021).*
(Continued)

*Primary Examiner* — Ronald Eisner
(74) *Attorney, Agent, or Firm* — Nokia Technologies Oy

(57)    ABSTRACT

There is provided an apparatus comprising determining, by a first access and mobility management function in a first network, that handover of a user equipment from the first access and mobility management function to a second access and mobility management function in a second network is required; sending, to the second access and mobility management function, a context update request for the user equipment, wherein the context update request comprises an indication that the source and target access node are the same; and receiving, from the second access and mobility management function, a context update response based on the context update request, the context update response comprising the indication that the source and target access node are the same.

9 Claims, 14 Drawing Sheets

(58) Field of Classification Search
    CPC ..... H04W 48/18; H04W 84/06; H04W 60/00;
                H04W 36/12; H04W 36/00–385
    See application file for complete search history.

(56)                    References Cited

OTHER PUBLICATIONS

ETSI TS 129 508 V18.10.0 (Jun. 2025), "5G System Session Management Event Exposure Service, Stage 3" (3GPP TS 29.508 version 18.10.0 Release 18), published on June of 2025. (Year: 2025).*

ETSI TS 123 502 V15.15.0 (Sep. 2021) "Procedures for the 5G System", published in September of 2021. (Year: 2021).*

"3rd Generation Partnership Project; Technical Specification Group Services and System Aspects; System architecture for the 5G System (5GS); Stage 2 (Release 17)", 3GPP TS 23.501, V17.2.0, Sep. 2021, pp. 1-542.

"3rd Generation Partnership Project; Technical Specification Group Services and System Aspects; Procedures for the 5G System (5GS); Stage 2 (Release 17)", 3GPP TS 23.502, V17.2.1, Sep. 2021, pp. 1-712.

"3rd Generation Partnership Project; Technical Specification Group Services and System Aspects; 5G System (5GS) Location Services (LCS); Stage 2 (Release 17)", 3GPP TS 23.273, V17.2.0, Sep. 2021, pp. 1-99.

"3rd Generation Partnership Project; Technical Specification Group Radio Access Network; NG-RAN; NG Application Protocol (NGAP) (Release 16)", 3GPP TS 38.413, V16.7.0, Oct. 2021, pp. 1-474.

"3rd Generation Partnership Project; Technical Specification Group Services and System Aspects; Study on architecture aspects for using satellite access in 5G (Release 17)", 3GPP TR 23.737, V17.2.0, Mar. 2021, pp. 1-95.

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

"3rd Generation Partnership Project; Technical Specification Group Radio Access Network; Solutions for NR to support hon-terrestrial networks (NTN) (Release 16)", 3GPP TR 38.821, V16.1.0, May 2021, pp. 1-140.

* cited by examiner

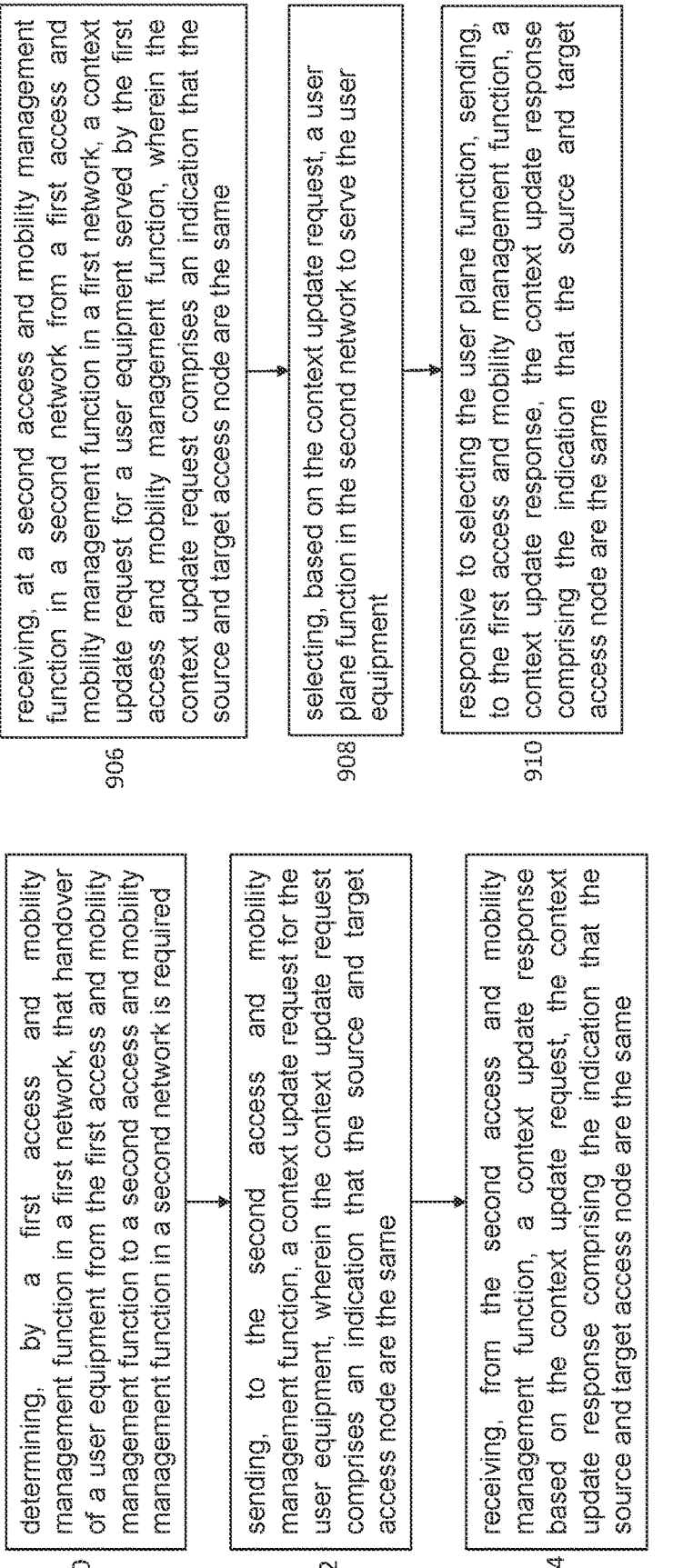

906 receiving, at a second access and mobility management function in a second network from a first access and mobility management function in a first network, a context update request for a user equipment served by the first access and mobility management function, wherein the context update request comprises an indication that the source and target access node are the same 908 selecting, based on the context update request, a user plane function in the second network to serve the user equipment 910 responsive to selecting the user plane function, sending, to the first access and mobility management function, a context update response, the context update response comprising the indication that the source and target access node are the same

Fig. 9B 900 determining, by a first access and mobility management function in a first network, that handover of a user equipment from the first access and mobility management function to a second access and mobility management function in a second network is required 902 sending, to the second access and mobility management function, a context update request for the user equipment, wherein the context update request comprises an indication that the source and target access node are the same 904 receiving, from the second access and mobility management function, a context update response based on the context update request, the context update response comprising the indication that the source and target access node are the same

Fig. 9A 914 receiving, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same 916 reconfiguring the user equipment based on the received handover command 918 sending, to the second access and mobility management function, a notification that handover is to be performed

Fig. 9D 912 sending, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same

Fig. 9C

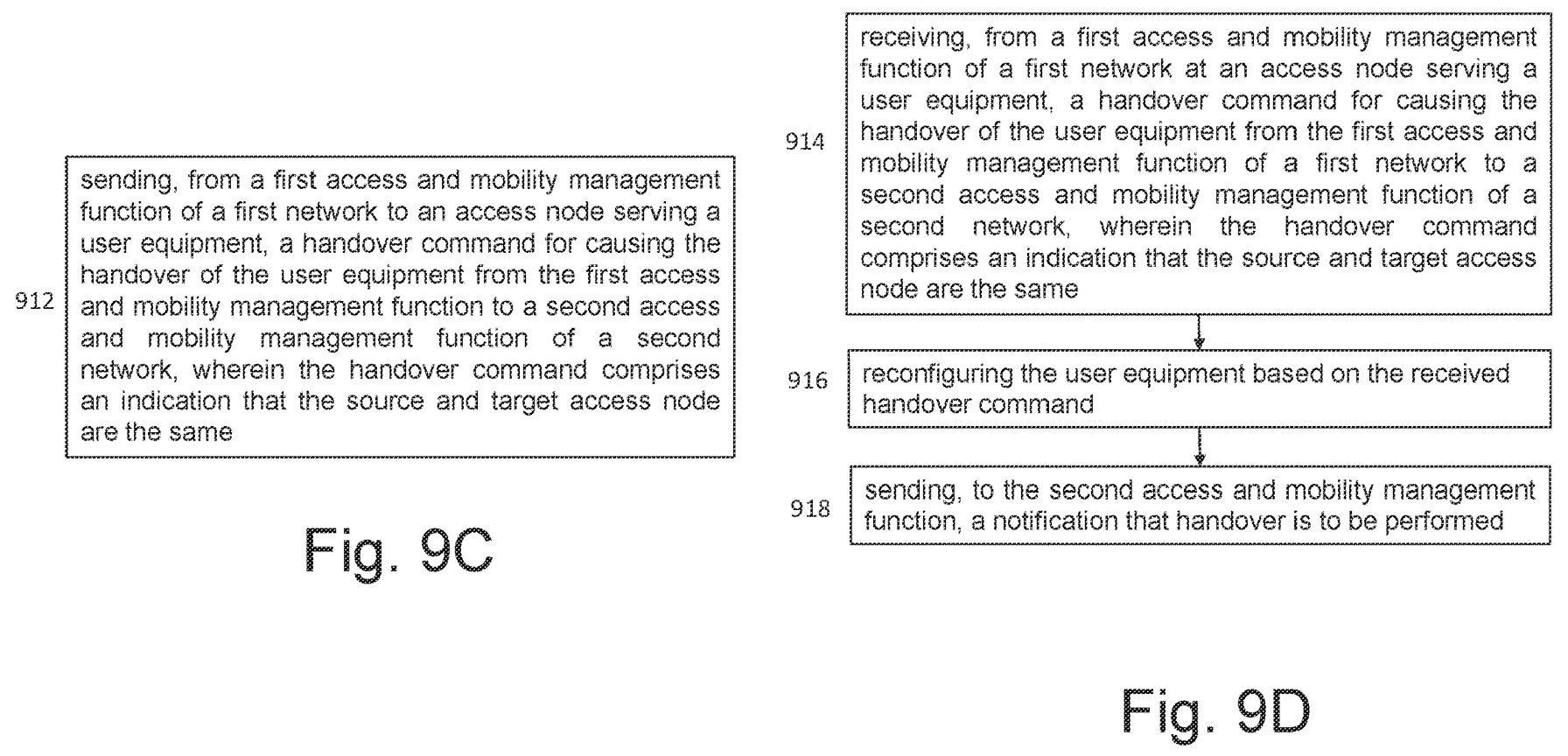

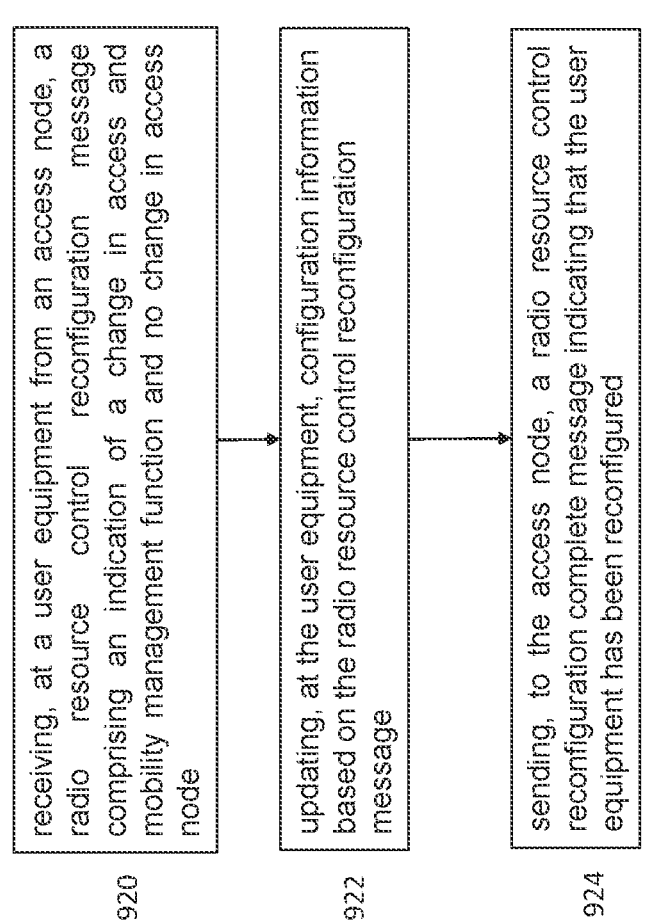

receiving, at a user equipment from an access node, a radio resource control reconfiguration message comprising an indication of a change in access and mobility management function and no change in access node

920 updating, at the user equipment, configuration information based on the radio resource control reconfiguration message

922 sending, to the access node, a radio resource control reconfiguration complete message indicating that the user equipment has been reconfigured

METHOD, APPARATUS AND COMPUTER PROGRAM FOR INDICATING THAT A SOURCE ACCESS NODE CONNECTED TO THE FIRST PUBLIC LAND MOBILE NETWORK AND A TARGET ACCESS NODE CONNECTED TO THE SECOND PUBLIC LAND MOBILE NETWORK AREA SAME ACCESS NODE

RELATED APPLICATIONS

This patent application claims the benefit of priority of Indian Patent Application No. 202241007523 filed Feb. 12, 2022, which is incorporated herein by reference in its entirety.

FIELD

The present application relates to a method, apparatus, and computer program and in particular but not exclusively to performing handover of a user equipment.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite-based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: determining, by a first access and mobility management function in a first network, that handover of a user equipment from the first access and mobility management function to a second access and mobility management function in a second network is required; sending, to the second access and mobility management function, a context update request for the user equipment, wherein the context update request comprises an indication that the source and target access node are the same; and receiving, from the second access and mobility management function, a context update response based on the context update request, the context update response comprising the indication that the source and target access node are the same.

The determining may comprise: determining, by a first access and mobility management function of a first network, that a user equipment served by an access node is in a location or area associated with the second network.

The means may be for: obtaining address information of the second access and mobility management function in the second network, wherein the sending is based on the obtained address information.

According to an aspect, there is provided an apparatus comprising means for: receiving, at a second access and mobility management function in a second network from a first access and mobility management function in a first network, a context update request for a user equipment served by the first access and mobility management function, wherein the context update request comprises an indication that the source and target access node are the same; selecting, based on the context update request, a user plane function in the second network to serve the user equipment; and responsive to selecting the user plane function, sending, to the first access and mobility management function, a context update response, the context update response comprising the indication that the source and target access node are the same.

According to an aspect, there is provided an apparatus comprising means for: sending, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same.

According to an aspect, there is provided an apparatus comprising means for: receiving, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same; reconfiguring the user equipment based on the received handover command; and sending, to the second access and mobility management function, a notification that handover is to be performed.

The reconfiguring may comprise: sending, to the user equipment, a radio resource control reconfiguration message based on the received handover command, wherein the handover command comprises an indication of a change in access and mobility management function and no change in access node; and receiving, from the user equipment, a radio resource control reconfiguration complete message indicating that the user equipment has been reconfigured.

The handover command may comprise information identifying the second access and mobility management function.

According to an aspect, there is provided an apparatus comprising means for: receiving, at a user equipment from an access node, a radio resource control reconfiguration message comprising an indication of a change in access and mobility management function and no change in access node; updating, at the user equipment, configuration information based on the radio resource control reconfiguration message; and sending, to the access node, a radio resource control reconfiguration complete message indicating that the user equipment has been reconfigured.

The change in access and mobility management function may comprise a change from a first access and mobility management function of a first network to a second access and mobility management function of a second network.

The access node may comprise one of: a g node B; and a satellite node B. The first network and/or the second network may comprise a public land mobile network.

According to an aspect, there is provided an apparatus comprising at least one processor and at least one memory including a computer program code, the at least one memory and computer program code configured to, with the at least one processor, cause the apparatus at least to: determine, by a first access and mobility management function in a first network, that handover of a user equipment from the first access and mobility management function to a second access and mobility management function in a second network is required; send, to the second access and mobility management function, a context update request for the user equipment, wherein the context update request comprises an indication that the source and target access node are the same; and receive, from the second access and mobility management function, a context update response based on the context update request, the context update response comprising the indication that the source and target access node are the same.

The at least one memory and at least one processor may be configured to cause the apparatus to: determine, by a first access and mobility management function of a first network, that a user equipment served by an access node is in a location or area associated with the second network.

The at least one memory and at least one processor may be configured to cause the apparatus to: obtain address information of the second access and mobility management function in the second network; and send the context update request based on the obtained address information.

According to an aspect, there is provided an apparatus comprising at least one processor and at least one memory including a computer program code, the at least one memory and computer program code configured to, with the at least one processor, cause the apparatus at least to: receive, at a second access and mobility management function in a second network from a first access and mobility management function in a first network, a context update request for a user equipment served by the first access and mobility management function, wherein the context update request comprises an indication that the source and target access node are the same; select, based on the context update request, a user plane function in the second network to serve the user equipment; and responsive to selecting the user plane function, send, to the first access and mobility management function, a context update response, the context update response comprising the indication that the source and target access node are the same.

According to an aspect, there is provided an apparatus comprising at least one processor and at least one memory including a computer program code, the at least one memory and computer program code configured to, with the at least one processor, cause the apparatus at least to: send, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same.

According to an aspect, there is provided an apparatus comprising at least one processor and at least one memory including a computer program code, the at least one memory and computer program code configured to, with the at least one processor, cause the apparatus at least to: receive, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same; reconfigure the user equipment based on the received handover command; and send, to the second access and mobility management function, a notification that handover is to be performed.

The at least one memory and at least one processor may be configured to cause the apparatus to: send, to the user equipment, a radio resource control reconfiguration message based on the received handover command, wherein the handover command comprises an indication of a change in access and mobility management function and no change in access node; and receive, from the user equipment, a radio resource control reconfiguration complete message indicating that the user equipment has been reconfigured.

The handover command may comprise information identifying the second access and mobility management function.

According to an aspect, there is provided an apparatus comprising at least one processor and at least one memory including a computer program code, the at least one memory and computer program code configured to, with the at least one processor, cause the apparatus at least to: receive, at a user equipment from an access node, a radio resource control reconfiguration message comprising an indication of a change in access and mobility management function and no change in access node; update, at the user equipment, configuration information based on the radio resource control reconfiguration message; and send, to the access node, a radio resource control reconfiguration complete message indicating that the user equipment has been reconfigured.

The change in access and mobility management function may comprise a change from a first access and mobility management function of a first network to a second access and mobility management function of a second network.

The access node may comprise one of: a g node B; and a satellite node B. The first network and/or the second network may comprise a public land mobile network.

According to an aspect, there is provided a method comprising: determining, by a first access and mobility management function in a first network, that handover of a user equipment from the first access and mobility management function to a second access and mobility management function in a second network is required; sending, to the second access and mobility management function, a context update request for the user equipment, wherein the context update request comprises an indication that the source and target access node are the same; and receiving, from the second access and mobility management function, a context update response based on the context update request, the context update response comprising the indication that the source and target access node are the same.

The determining may comprise: determining, by a first access and mobility management function of a first network, that a user equipment served by an access node is in a location or area associated with the second network.

The method may comprise: obtaining address information of the second access and mobility management function in the second network, wherein the sending is based on the obtained address information.

According to an aspect, there is provided a method comprising: receiving, at a second access and mobility management function in a second network from a first access and mobility management function in a first network, a context update request for a user equipment served by the first access and mobility management function, wherein the context update request comprises an indication that the source and target access node are the same; selecting, based on the context update request, a user plane function in the second network to serve the user equipment; and responsive to selecting the user plane function, sending, to the first access and mobility management function, a context update response, the context update response comprising the indication that the source and target access node are the same.

According to an aspect, there is provided a method comprising: sending, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same.

According to an aspect, there is provided a method comprising: receiving, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same; reconfiguring the user equipment based on the received handover command; and sending, to the second access and mobility management function, a notification that handover is to be performed.

The reconfiguring may comprise: sending, to the user equipment, a radio resource control reconfiguration message based on the received handover command, wherein the handover command comprises an indication of a change in access and mobility management function and no change in access node; and receiving, from the user equipment, a radio resource control reconfiguration complete message indicating that the user equipment has been reconfigured.

The handover command may comprise information identifying the second access and mobility management function.

According to an aspect, there is provided a method comprising: receiving, at a user equipment from an access node, a radio resource control reconfiguration message comprising an indication of a change in access and mobility management function and no change in access node; updating, at the user equipment, configuration information based on the radio resource control reconfiguration message; and sending, to the access node, a radio resource control reconfiguration complete message indicating that the user equipment has been reconfigured.

The change in access and mobility management function may comprise a change from a first access and mobility management function of a first network to a second access and mobility management function of a second network.

The access node may comprise one of: a g node B; and a satellite node B. The first network and/or the second network may comprise a public land mobile network.

According to an aspect, there is provided a computer readable medium comprising program instructions for causing an apparatus to perform at least the following: determining, by a first access and mobility management function in a first network, that handover of a user equipment from the first access and mobility management function to a second access and mobility management function in a second network is required; sending, to the second access and mobility management function, a context update request for the user equipment, wherein the context update request comprises an indication that the source and target access node are the same; and receiving, from the second access and mobility management function, a context update response based on the context update request, the context update response comprising the indication that the source and target access node are the same.

The determining may comprise: determining, by a first access and mobility management function of a first network, that a user equipment served by an access node is in a location or area associated with the second network.

The program instruction may be for causing the apparatus to perform: obtaining address information of the second access and mobility management function in the second network, wherein the sending is based on the obtained address information.

According to an aspect, there is provided a computer readable medium comprising program instructions for causing an apparatus to perform at least the following: receiving, at a second access and mobility management function in a second network from a first access and mobility management function in a first network, a context update request for a user equipment served by the first access and mobility management function, wherein the context update request comprises an indication that the source and target access node are the same; selecting, based on the context update request, a user plane function in the second network to serve the user equipment; and responsive to selecting the user plane function, sending, to the first access and mobility management function, a context update response, the context update response comprising the indication that the source and target access node are the same.

According to an aspect, there is provided a computer readable medium comprising program instructions for causing an apparatus to perform at least the following: sending, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same.

According to an aspect, there is provided a computer readable medium comprising program instructions for causing an apparatus to perform at least the following: receiving, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same; reconfiguring the user equipment based on the received handover command; and sending, to the second access and mobility management function, a notification that handover is to be performed.

The reconfiguring may comprise: sending, to the user equipment, a radio resource control reconfiguration message based on the received handover command, wherein the handover command comprises an indication of a change in access and mobility management function and no change in access node; and receiving, from the user equipment, a radio resource control reconfiguration complete message indicating that the user equipment has been reconfigured.

The handover command may comprise information identifying the second access and mobility management function.

According to an aspect, there is provided a computer readable medium comprising program instructions for causing an apparatus to perform at least the following: receiving, at a user equipment from an access node, a radio resource control reconfiguration message comprising an indication of a change in access and mobility management function and no change in access node; updating, at the user equipment, configuration information based on the radio resource control reconfiguration message; and sending, to the access node, a radio resource control reconfiguration complete message indicating that the user equipment has been reconfigured.

The change in access and mobility management function may comprise a change from a first access and mobility management function of a first network to a second access and mobility management function of a second network.

The access node may comprise one of: a g node B; and a satellite node B. The first network and/or the second network may comprise a public land mobile network.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 9A shows a flowchart of a method according to some examples;

FIG. 9B shows a flowchart of a method according to some examples;

FIG. 9C shows a flowchart of a method according to some examples;

FIG. 9D shows a flowchart of a method according to some examples; and

FIG. 9E shows flowchart of a method according to some examples.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1A:
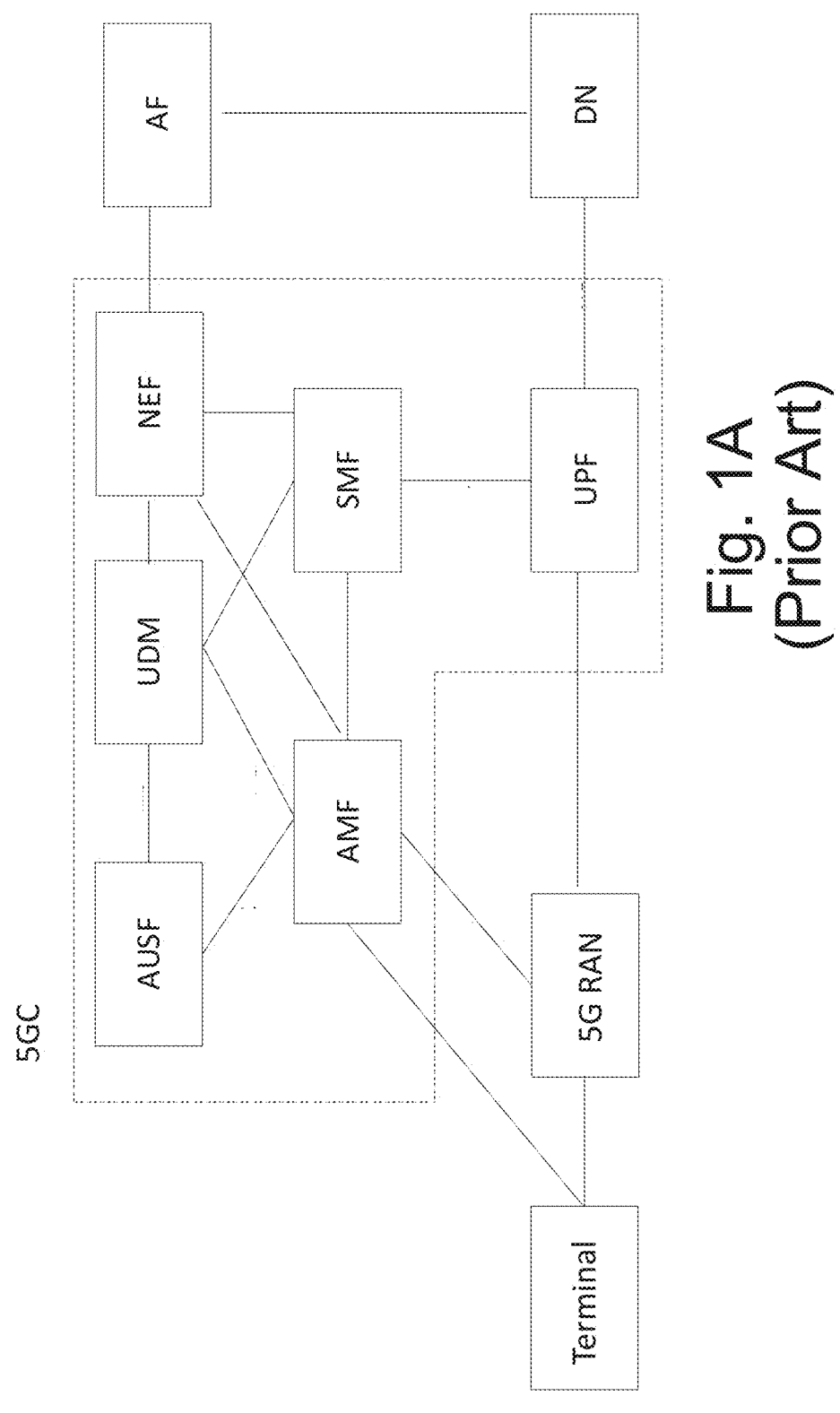
FIG. 1A shows a representation of a network system according to some example embodiments.
Figure 1B:
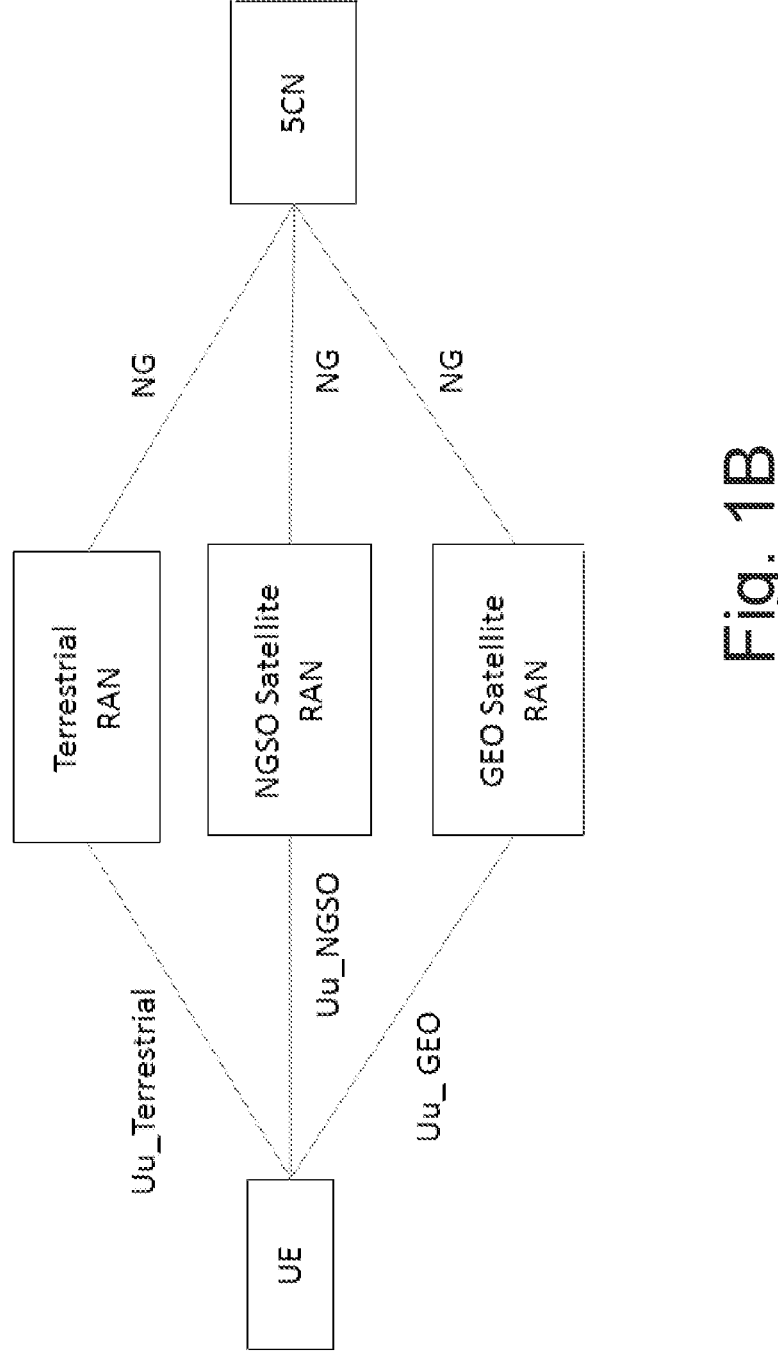
FIG. 1B shows a representation of a user equipment interfacing with a 5G core network via a plurality of different access node types.

FIG. 1A shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. In some examples, the 5G-RAN may comprise a satellite RAN, such as a satellite node B (sNB). For example, with reference to FIG. 1B, the 5G-RAN may comprise a terrestrial RAN, an NGSO satellite RAN, and a GEO satellite RAN, each of which may provide the UE with a connection to the 5GC. In some examples, where the UE is capable of multi-connectivity, the UE may access the 5GC via two or more of the terrestrial RAN, NGSO satellite RAN, and GEO satellite RAN.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
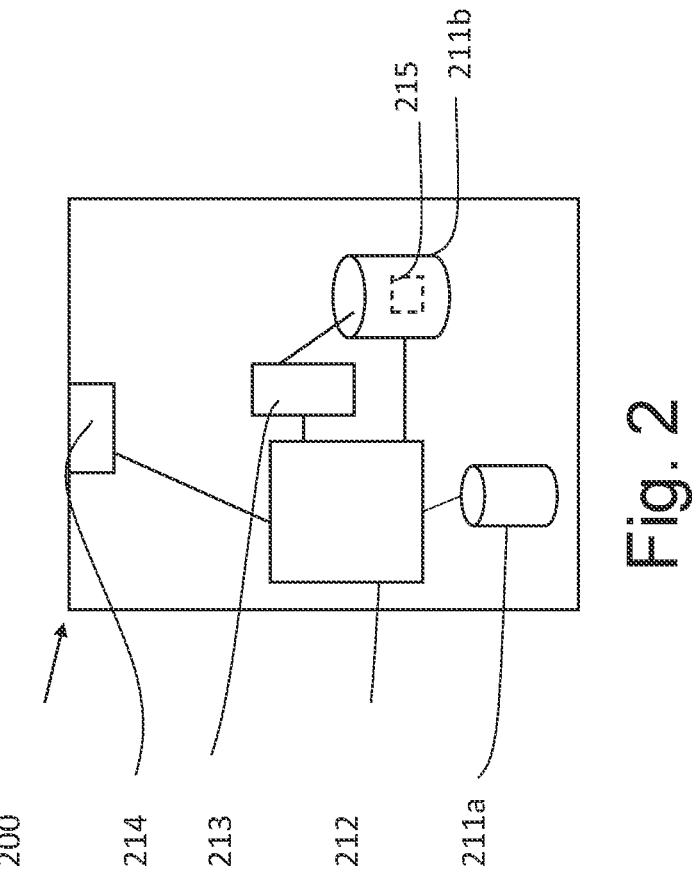
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
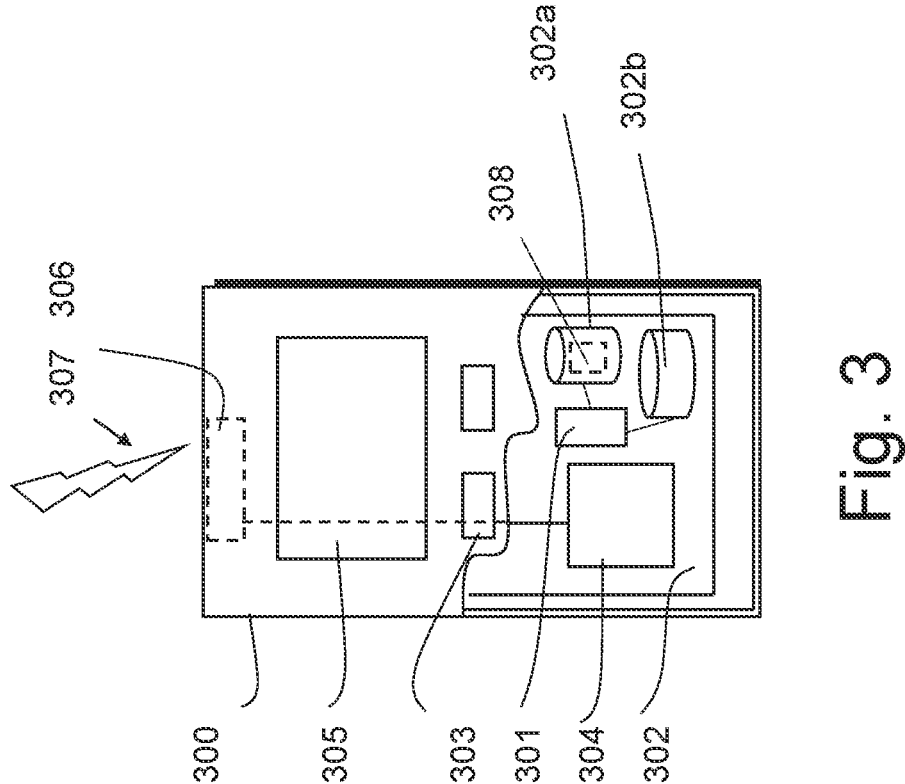
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Some devices, such as a satellite telephone, satellite phone or satphone, may connect to other devices or networks through orbiting satellites instead of terrestrial cell sites. An advantage of such devices is that their use may not be limited to areas covered by cell towers; they can be used in most or all geographic locations on the Earth's surface.

When the network receives a Registration Request from a UE accessing the network over satellite, the network may verify the UE location during registration procedure over satellite access, as it cannot be guaranteed that the UE would always be aware of its present location.

When the UE accessing over satellite RAT Type initiates a Registration Procedure, the AMF may trigger a UE positioning procedure to verify that the UE is accessing the network (e.g. a public land mobile network, PLMN) in the same country as the present UE location. The AMF may verify registration criteria as usual, but with the additional verification whether the network selected by the UE matches with the country of the UE location. When evaluating whether the UE is allowed to access the selected PLMN, the AMF may take into account whether the UE is allowed to access 90x satellite MCC in multiple countries.

If UE is attempting to register to PLMN that it is not allowed to access in the present UE location (e.g., PLMN of different country than the present UE location), the AMF may respond with a Registration Reject message. The message may include suitable cause value(s) to tell the UE that the selected PLMN is not allowed in the present UE location. Based on the UE location, the AMF may also include an indication of country code (MCC) or list of PLMN codes (MCC+MNC) or list of PLMN+RAT codes (MCC+MNC+RAT).

In order to ensure the call being routed to a public safety access point of the country of the UE location, the AMF may take the same approach if the UE is requesting emergency registration in a country that is different from the UE location.

After receiving the Registration Reject message indicating that the requested PLMN is not allowed in the present UE location, the UE in automatic PLMN selection mode may attempt to select another PLMN, using the indication received from the rejecting PLMN. The UE may memorise the PLMN that is not allowed in the present county for as long as the UE remains in that country. UE in manual PLMN selection mode may behave as normal, i.e. may remain camping on cell in limited service state after receiving the Registration Reject message. If necessary, a new cause value telling the user the reason for no service may be included in the message.

If the UE is in an RRC CONNECTED mode, the UE may not need to initiate Registration Updates. This may result in the UE moving from one country to another while in connected mode. In such cases, the UE may verify its location periodically, or the network positioning the UE periodically, or both. The UE and network policy for such periodic verification of the UE location within the country of a RPLMN may be implementation specific.

Figure 4:
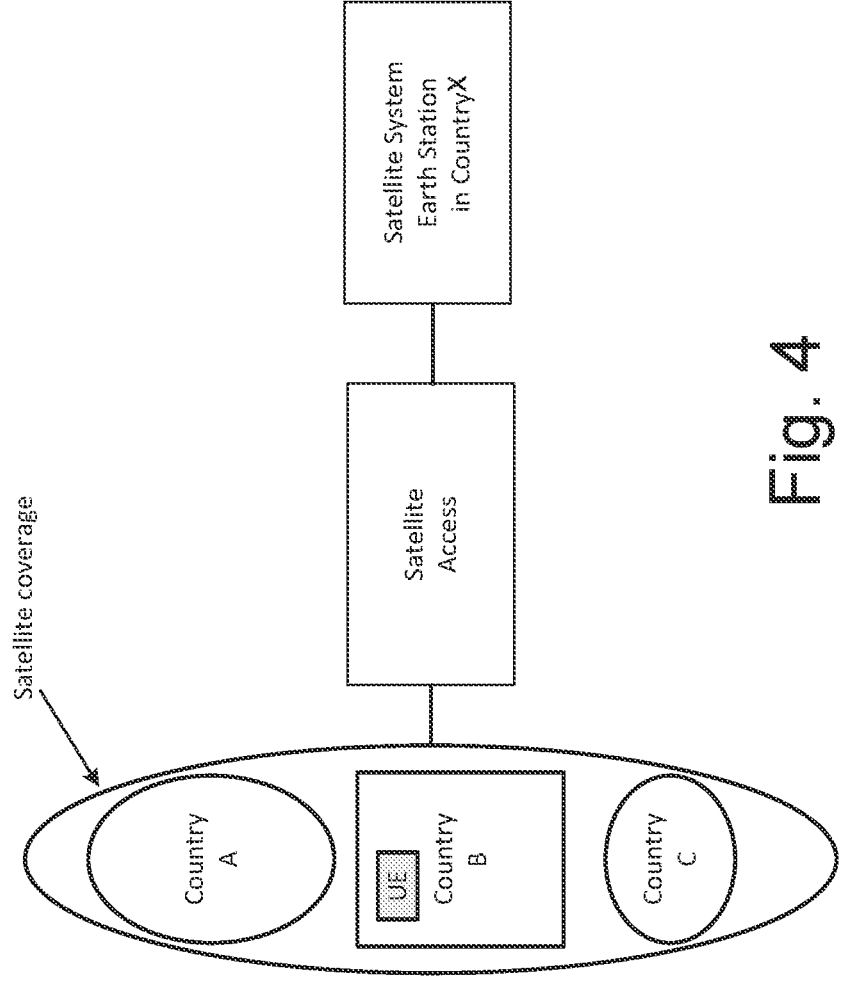
FIG. 4 shows an illustration of a satellite node B coverage extending over a plurality of countries.

Thus, with UEs capable of accessing PLMNs over satellite, geographical associated logistical complexities may arise, for example when a satellite's coverage crosses country borders and/or the UE's communications use terrestrial equipment (e.g. Earth stations) that are in a different country to the UE. This is illustrated in FIG. 4, where the satellite coverage spans countries A, B and C, and where the UE is located in country B, and the satellite system earth station is located in country X.

FIGS. 5A, 5B, 6A, and 6B illustrate an example inter NG-RAN handover procedure for a UE, as set out in 3GPP TS 23.502.

Figure 5A:
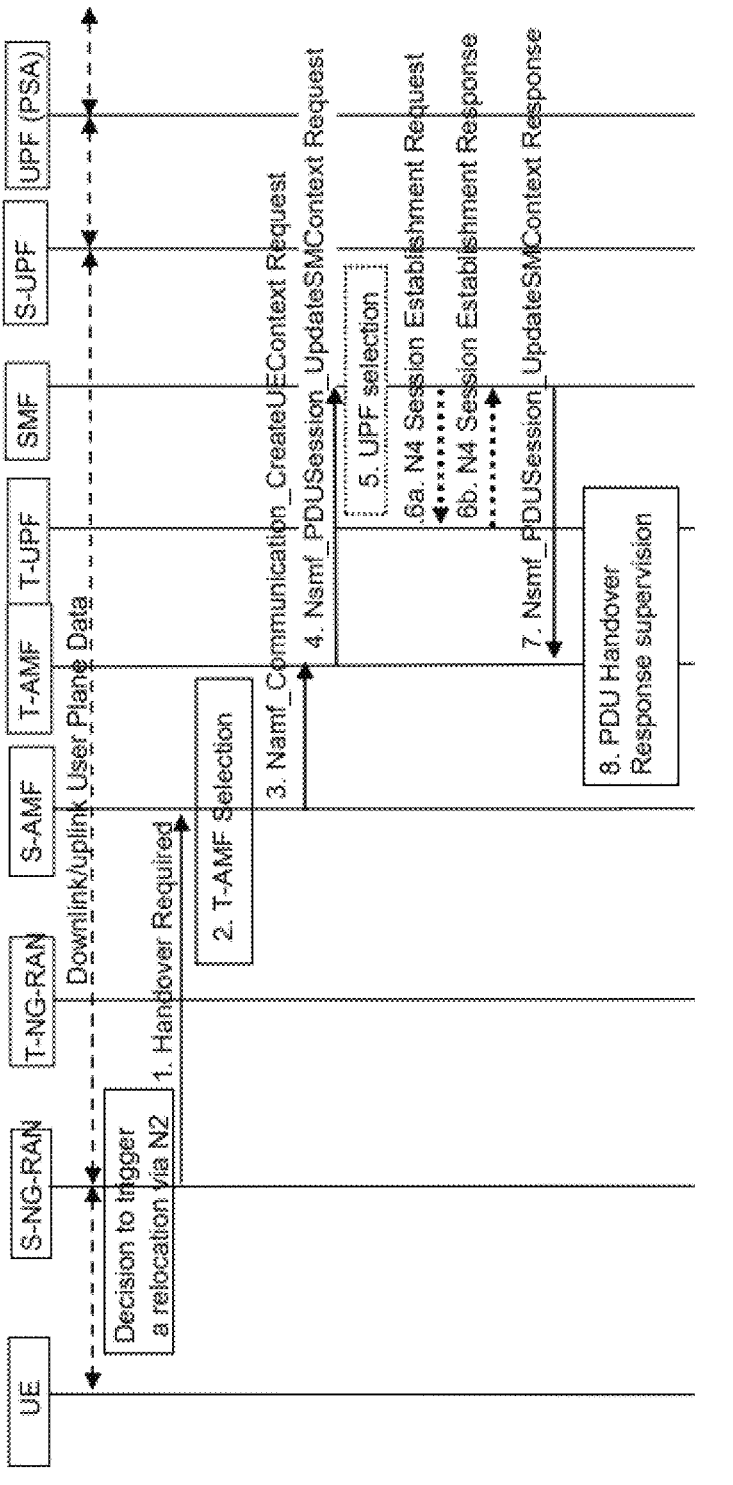
FIGS. 5A and 5B illustrate an example of a preparation phase of an inter NG-RAN handover procedure.
Figure 5B:
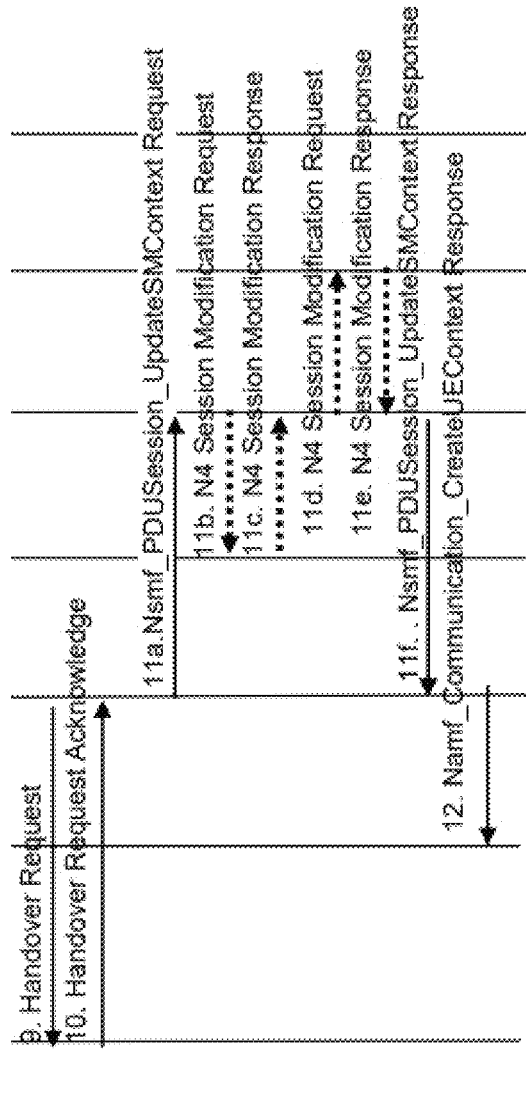
Figure 6A:
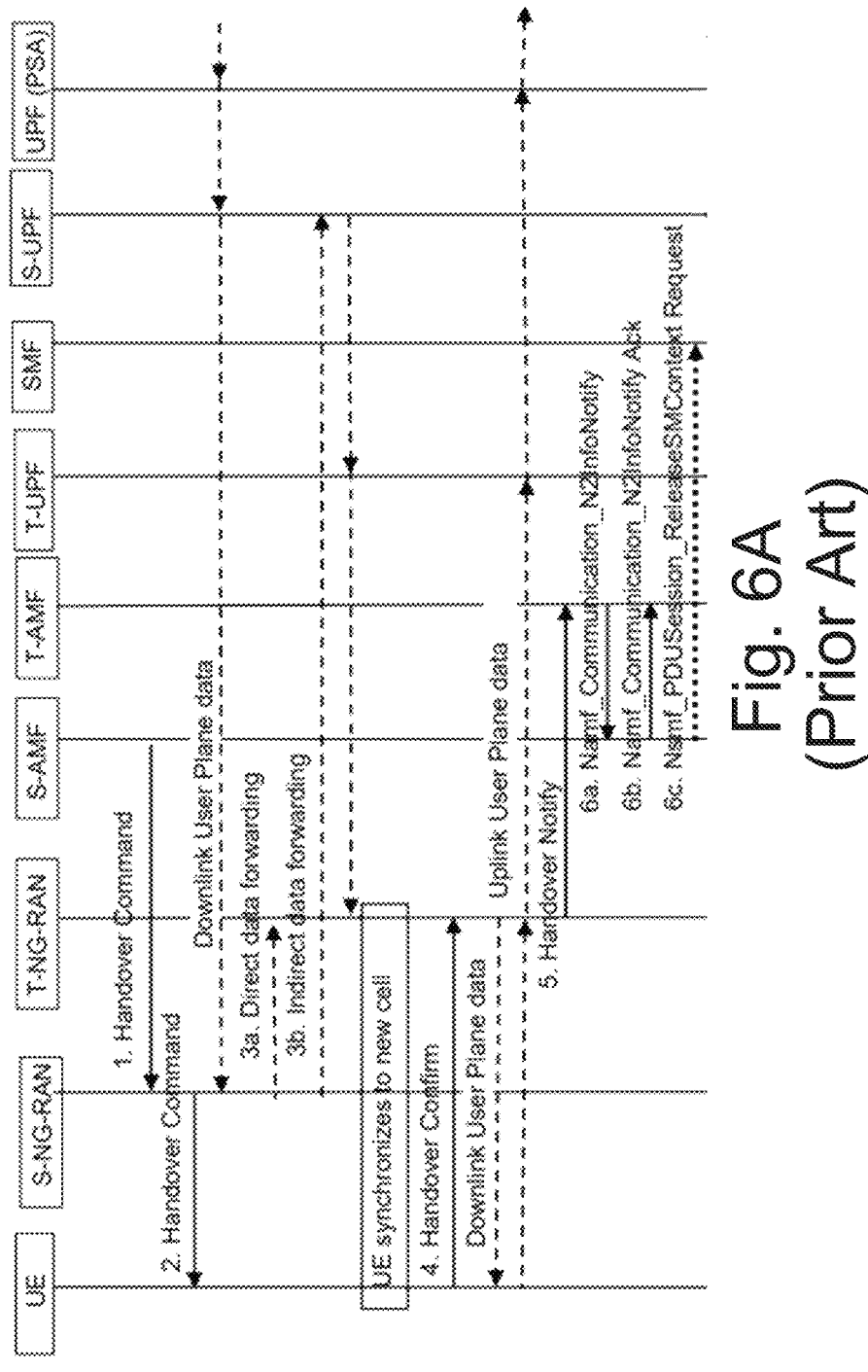
FIGS. 6A and 6B illustrates an example of an execution phase of a NG-RAN handover procedure.
Figure 6B:
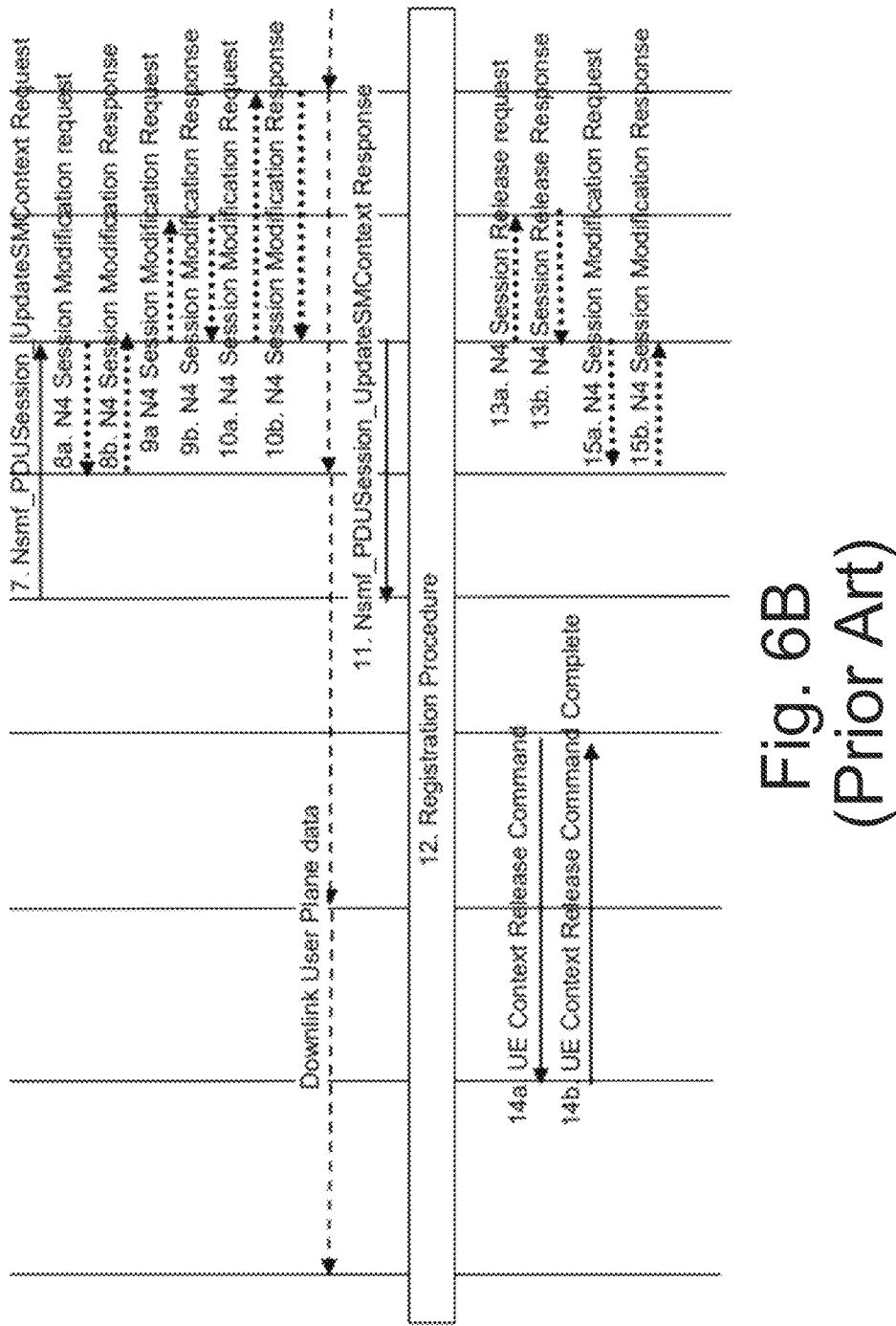

The example handover procedure is comprised of two phases—a preparation phase, shown in FIGS. 5A and 5B, and an execution phase, shown in FIGS. 6A and 6B. Such a procedure may for example occur when the source NG-RAN (S-NG-RAN) decides to initiate an N2-based handover to the target NG-RAN (T-NG-RAN). This can be triggered, for example, due to new radio conditions or load balancing, if there is no Xn connectivity to the target NG-RAN, an error indication from the target NG-RAN after an unsuccessful Xn-based handover (i.e. no IP connectivity between T-RAN and S-UPF), or based on dynamic information learnt by the S-RAN.

It should be understood that some of the steps shown in FIGS. 5A, 5B, 6A and 6B may be conditional or optional, and thus may not be executed in every inter NG-RAN handover procedure. It should also be understood that execution of the method shown in FIGS. 6A and 6B may follow execution of the method shown in FIGS. 5A and 5B.

Referring first to FIGS. 5A and 5B, which illustrates a preparation phase for inter NG-RAN handover according to some examples, at step 1, the S-RAN sends, to the S-AMF, an indication that handover is required. The indication may comprise a Target ID, Source to Target transparent container, SM N2 info list, PDU Session IDs, and intra system handover indication.

The Target ID may include the selected PLMN ID.

The Source to Target transparent container may include NG-RAN information created by the S-RAN to be used by T-RAN, and may be transparent to the 5GC. It may also contain, for each PDU session, the corresponding User Plane Security Enforcement information, QoS flows/DRBs information subject to data forwarding.

All PDU Sessions handled by the S-RAN (i.e., all existing PDU Sessions with active UP connections) may be included in the Handover Required message, which may indicate which of those PDU Session(s) are requested by S-RAN to handover. The SM N2 info may include Direct Forwarding Path Availability if direct data forwarding is not available.

The Direct Forwarding Path Availability may indicate whether direct forwarding is available from the S-RAN to the T-RAN. This indication from S-RAN can be based on e.g., the presence of IP connectivity and security association(s) between the S-RAN and the T-RAN.

At step 2, the T-AMF may be selected by the S-AMF. For example, when the S-AMF can't serve the UE anymore, the S-AMF may select the T-AMF. The selection may be as described in clause 6.3.5 on "AMF Selection Function" in TS 23.501.

At step 3, the S-AMF may send to the T-AMF a Namf_Communication_CreateUEContext Request. The request may comprise N2 Information (such as a Target ID, Source to Target transparent container, SM N2 information list, PDU Session IDs, Service area restriction), UE context information (such as SUPI, Allowed NSSAI for each Access Type if available, the list of PDU Session IDs along with the corresponding SMF information and the corresponding S-NSSAI(s), PCF ID(s) and DNN).

The S-AMF may initiate Handover resource allocation procedure by invoking the Namf_Communication_CreateUEContext service operation towards the T-AMF.

When the S-AMF can still serve the UE, this step may not be needed.

If Service area restrictions are available in the S-AMF, they may be forwarded to the T-AMF as described in clause 5.3.4.1.2 of TS 23.501.

If both Home and Visited PCF ID(s) are provided by the S-AMF, the T-AMF may contact the (V-)PCF identified by the (V-)PCF ID. If the (V-)PCF identified by the (V-)PCF ID cannot be used (e.g., no response from the (V-)PCF) or there are no PCF ID(s) received from the S-AMF, the T-AMF may select the PCF(s) as described in TS 23.501, clause 6.3.7.1 and according to the V-NRF to H-NRF interaction described in clause 4.3.2.2.3.3.

At step 4, the T-AMF may send to the SMF a Nsmf_PDUSession_UpdateSMContext message. The message may comprise PDU Session ID, Target ID, T-AMF ID, and SM N2 Info.

For each PDU Session indicated by S-RAN, the AMF may invoke the Nsmf_PDUSession_UpdateSMContext Request to the associated SMF. However, if the S-NSSAI associated with PDU Session is not available in the T-AMF, the T-AMF may not invoke Nsmf_PDUSession_UpdateSMContext for this PDU Session.

The PDU Session ID may indicate a PDU Session candidate for N2 Handover. The Target ID may indicate the UE location information. SM N2 Info may include the Direct Forwarding Path Availability.

If the (T-)AMF detects that the UE moves into a non-allowed area based on Service area restrictions, the (T-)AMF may notify each SMF corresponding to the list of PDU Sessions received from the Handover Required message that the UE is only reachable for regulatory prioritized services.

At step 5, based on the Target ID, the SMF may check if N2 Handover for the indicated PDU Session can be accepted. The SMF may also check the UPF Selection Criteria according to clause 6.3.3 of TS 23.501. If the UE has moved out of the service area of the UPF connecting to NG-RAN, SMF may select a new intermediate UPF.

At step 6a, the SMF sends to the T-UPF an N4 Session Establishment Request.

If the SMF selects a new intermediate UPF, i.e. the target UPF (T-UPF), for the PDU Session and if CN Tunnel Info is allocated by the T-UPF, an N4 Session Establishment Request message may be sent to the T-UPF, providing Packet detection, enforcement and reporting rules to be installed on the T-UPF. The PDU Session Anchor Tunnel Info for this PDU Session may also be provided to the T-UPF.

At step 6b, the T-UPF sends to the SMF a N4 Session Establishment Response. The T-UPF may send an N4 Session Establishment Response message to the SMF with DL CN Tunnel Info and UL CN Tunnel Info (i.e. N3 tunnel info). The SMF may start a timer to release the resource of S-UPF, which is to be used in step 13a of the Execution Phase.

At step 7, the SMF send to T-AMF a Nsmf_PDUSession_UpdateSMContext Response.

If N2 handover for the PDU Session is accepted, the SMF may include in the Nsmf_PDUSession_UpdateSMContext response the N2 SM Information containing the N3 UP address and the UL CN Tunnel ID of the UPF and the QoS parameters indicating that the N2 SM Information is for the Target NG-RAN. If the Direct Forwarding Path Availability indicates direct forwarding is not available and the SMF knows that there is no indirect data forwarding connectivity between source and target, the N2 SM Information may also include a Data forwarding not possible indication.

If N2 handover for the PDU Session is not accepted as described in step 4, the SMF may not include an N2 SM Information regarding the PDU Session to avoid establishment of radio resources at the target NG-RAN. Instead of that, the SMF may provide a reason for non-acceptance. If the SMF is notified that the UE is only reachable for regulatory prioritized services, the SMF may not include any N2 SM info regarding the PDU Session for nonregulatory prioritized services to avoid establishment of radio resources at the target NG-RAN.

The SMF may the Nsmf_PDUSession_UpdateSMContext response without including the CN Tunnel Info to the AMF for the PDU Session(s) which is to be released, and then release the PDU Session(s) in a separate procedure as defined in clause 4.3.4.

At step 8, the AMF supervises the Nsmf_PDUSession_UpdateSMContext Response messages from the involved SMFs. The lowest value of the Max delay indications for the PDU Sessions that are candidates for handover may give the maximum time AMF may wait for Nsmf_PDUSession_UpdateSMContext Response messages before continuing with the N2 Handover procedure. At expiry of the maximum wait time or when all Nsmf_PDUSession_UpdateSMContext Response messages are received, AMF may continue with the N2 Handover procedure at step 9.

The delay value for each PDU Session may be locally configured in the AMF and may be implementation specific.

At step 9, the T-AMF sends to the T-RAN a Handover Request. The request may comprise a Source to Target transparent container, N2 MM Information, N2 SM Information list, Handover Restriction List, Non-accepted PDU Session List.

The T-AMF may determine the T-RAN based on Target ID. T-AMF may allocate a 5G-GUTI valid for the UE in the AMF and target TAI.

The Source to Target transparent container may be forwarded as received from S-RAN. N2 MM Information may for example include security information and Handover Restriction List if available in the T-AMF.

The N2 SM Information list may include N2 SM Information received from SMFs for the T-RAN in the Nsmf_PDUSession_UpdateSMContext Response messages received within allowed max delay supervised by the T-AMF mentioned in step 8.

The Handover Restriction List may be sent if available in the Target AMF.

The Non-accepted PDU Session List may be generated by the AMF and may include following PDU Session(s) with proper cause value:

Non-accepted PDU Session(s) by the SMF(s);

Non-accepted PDU Session(s) by the AMF due to no response from the SMF within maximum wait time; and Non-accepted PDU Session(s) by the AMF due to non-available S-NSSAI in the T-AMF, which is decided at step 4.

At step 10, the T-RAN sends to the T-AMF a Handover Request Acknowledgement. The acknowledgement may comprise a Target to Source transparent container, N2 SM response list, PDU Sessions failed to be setup list, T-RAN SM N3 forwarding Information list.

The Target to Source transparent container may include a UE container with an access stratum part and a NAS part. The UE container may be sent transparently via T-AMF, S-AMF and S-RAN to the UE.

The T-RAN may create a PDU Sessions failed to be setup list and reason for failure (e.g., SMF decision, SMF response too late, or T-RAN decision, S-NSSAI is not available, unable to fulfil User Plane Security Enforcement) based on Non-accepted PDU Session List and T-RAN determination. The information may be provided to the S-RAN.

The N2 SM response list may include, per each received N2 SM Information, a PDU Session ID and an N2 SM response indicating the PDU Session ID and, if T-RAN accepted, the N2 Handover request for the PDU Session. This may also include also a PDU Session Modified indication if the T-RAN could only established user plane resources for the PDU session that do not fulfil the User Plane Security Enforcement with a value Preferred.

For each PDU Session accepted by the T-RAN for N2 Handover, the N2 SM response may include N3 UP address and Tunnel ID of T-RAN.

The T-RAN SM N3 forwarding info list may include, per each PDU Session accepted by the T-RAN and has at least one QoS Flow subject for data forwarding, N3 UP address and Tunnel ID of T-RAN for receiving forwarded data if necessary. The T-RAN may provide data forwarding addresses for each data forwarding tunnel which it decided to setup.

At step 11a, the AMF may send to the SMF a Nsmf_PDUSession_UpdateSMContext Request. The request may comprise a PDU Session ID, N2 SM response, T-RAN SM N3 forwarding Information list.

For each N2 SM response received from the T-RAN (included in N2 SM response list), the AMF may send the received N2 SM response to the SMF indicated by the respective PDU Session ID.

If no new T-UPF is selected, SMF may store the N3 tunnel info of T-RAN from the N2 SM response if N2 handover is accepted by T-RAN.

The SMF/UPF may allocate the N3 UP address and Tunnel IDs for indirect data forwarding corresponding to the data forwarding tunnel endpoints established by T-RAN.

At step 11b, the SMF may send to T-UPF an N4 Session Modification Request. The request may comprise T-RAN SM N3 forwarding Information list, indication to allocate DL forwarding tunnel(s) for indirect forwarding.

If the SMF selected a T-UPF in step 6a, the SMF may update the T-UPF by providing the T-RAN SM N3 forwarding information list by sending a N4 Session Modification Request to the T-UPF.

If indirect forwarding applies based on indication from the S-RAN and the UPF is re-allocated and if the SMF decides to setup the indirect forwarding tunnel on the same T-UPF, the SMF may also request, in the N4 Session Modification Request message to the T-UPF, to allocate DL forwarding tunnel(s) for indirect forwarding.

Indirect forwarding may be performed via a UPF which is different from the T-UPF, in which case the SMF may select a T-UPF for indirect forwarding.

At step 11c, the T-UPF may send to the SMF a N4 Session Modification Response. The response may comprise T-UPF SM N3 forwarding Information list.

The T-UPF may allocate Tunnel Info and returns an N4 Session Modification Response message to the SMF. The T-UPF SM N3 forwarding info list may include T-UPF N3 address, T-UPF N3 Tunnel identifiers for forwarding data.

At step 11d, the SMF may send to the S-UPF, an N4 Session Modification Request. The request may comprise T-RAN SM N3 forwarding Information list or T-UPF SM N3 forwarding Information list, indication to allocate DL forwarding tunnel(s) for indirect forwarding.

If the UPF is re-allocated, this message may include the T-UPF SM N3 forwarding info list. If the UPF is not reallocated, this message may include the T-RAN SM N3 forwarding info list.

If indirect forwarding applies based on indication from NG-RAN and UPF allocates tunnel identities, the SMF may indicate in the N4 Session Modification Request message to the S-UPF to allocate DL forwarding tunnel(s) for indirect forwarding.

Indirect forwarding may be performed via a UPF which is different from the S-UPF.

At step 11e, the S-UPF may send to the SMF an N4 Session Modification Response. The response may comprise S-UPF SM N3 forwarding Information list.

The S-UPF may allocate Tunnel Info and returns an N4 Session establishment Response message to the SMF.

The S-UPF SM N3 forwarding Information list may include S-UPF N3 address, S-UPF N3 Tunnel identifiers for DL data forwarding.

At step 11f, the SMF may send to the T-AMF, a Nsmf_P-DUSession_UpdateSMContext Response. The response may comprise N2 SM Information.

The SMF may send an Nsmf_PDUSession_UpdateSM-Context Response message per PDU Session to T-AMF. The SMF may create an N2 SM information containing the DL forwarding Tunnel Info to be sent to the S-RAN by the AMF. The SMF may include this information in the Nsmf_P-DUSession_UpdateSMContext response.

The DL forwarding Tunnel Info can be one of the following information:

If direct forwarding applies, then the SMF may include the T-RAN N3 forwarding information the SMF received in step 11a;

If the indirect forwarding tunnel is setup in step 11b or 11d, then the SMF may include the T-UPF or S-UPF DL forwarding information containing the N3 UP address and the DL Tunnel ID of the UPF.

The SMF may start an indirect data forwarding timer, to be used to release the resource of indirect data forwarding tunnel.

At step 12, the T-AMF may send to the S-AMF a Namf_Communication_CreateUEContext Response. The response may comprise N2 information necessary for S-AMF to send Handover Command to S-RAN including Target to Source transparent container, PDU Sessions failed to be setup list, N2 SM information (N3 DL forwarding Information).

The AMF may supervise the Nsmf_PDUSession_Up-dateSMContext Response message from the involved SMFs. At expiry of the maximum wait time or when all Nsmf_P-DUSession_UpdateSMContext Response messages are received, T-AMF may send the Namf_Communication-_CreateUEContext Response to the S-AMF.

The Target to Source transport container may be received from the T-RAN. The N2 SM Information may be received from the SMF in step 11f.

Referring now to FIGS. 6A and 6B, which illustrates an execution phase for inter NG-RAN handover according to some examples, at step 1, the S-AMF send to the S-RAN a Handover Command. The command may comprise Target to Source transparent container, PDU Sessions failed to be setup list, SM forwarding info list.

The Target to Source transparent container may be forwarded as received from S-AMF.

The SM forwarding info list may include T-RAN SM N3 forwarding info list for direct forwarding or S-UPF SM N3 forwarding info list for indirect data forwarding The S-RAN may use the PDU Sessions failed to be setup list and the indicated reason for failure to decide whether to proceed with the N2 Handover procedure.

At step 2, the S-RAN sends to the UE a Handover Command. The command may comprise a UE container. The UE container may be a UE part of the Target to Source transparent container which may be sent transparently from T-RAN via AMF to S-RAN and may be provided to the UE by the S-RAN.

At step 3, Uplink packets are sent from T-RAN to T-UPF and UPF (PSA). Downlink packets are sent from UPF (PSA)

to S-RAN via S-UPF. The S-RAN may start forwarding of downlink data from the S-RAN towards the T-RAN for QoS Flows or DRBs subject to data forwarding. This may be either direct (step 3a) or indirect forwarding (step 3b).

At step 4, the UE sends to the T-RAN a Handover Confirmation.

After the UE has successfully synchronized to the target cell, it may send a Handover Confirm message to the TRAN. Handover is by this message may be considered as success-ful by the UE.

At step 5, the T-RAN sends to the T-AMF a Handover Notification. Handover may be considered as successful in T-RAN by this message.

At step 6a, the T-AMF sends to the S-AMF a Namf_Communication_N2InfoNotify message.

The T-AMF may notify to the S-AMF about the N2 handover notify received from the T-RAN by invoking the Namf_Communication_N2InfoNotify message. A timer in S-AMF may be started to supervise when resources in S-RAN shall be release.

At step 6b, the S-AMF sends to the T-AMF a Namf_Communication_N2InfoNotify ACK message. The S-AMF may acknowledge by sending the Namf_Communication_N2InfoNotify ACK to the T-AMF.

At step 6c, the S-AMF sends to the SMF a Nsmf_P-DUSession_ReleaseSMContext Request. The request may comprise SUPI, PDU Session ID.

If the PDU Session(s) is not accepted by the T-AMF (e.g., S-NSSAI associated with the PDU Session is not available in the T-AMF), S-AMF may trigger PDU Session Release procedure after the S-AMF is notified for the reception of N2 Handover Notify in step 6a.

At step 7, the T-AMF sends to the SMF a Nsmf_PDUSes-sion_UpdateSMContext Request. The request may comprise Handover Complete indication for PDU Session ID.

The Handover Complete indication may be sent per each PDU Session to the corresponding SMF to indicate the success of the N2 Handover. The UDM may update UE context in registered T-AMF in UDR, by Nudr_DM_Up-date. The update may comprise SUPI, Subscription Data, UE context in AMF data.

When an Nsmf_PDUSession_UpdateSMContext Response message arrived too late during the handover preparation phase (see step 8 of clause 4.9.1.3.2), or the PDU Session with SMF involvement is not accepted by T-RAN, a Nsmf_PDUSession_UpdateSMContext Request may be sent to the corresponding SMF allowing the SMF to deallocate a possibly allocated N3 UP address and Tunnel ID of the selected UPF. The request may comprise SUPI, PDU Session ID, Operation Type.

A PDU Session handled by that SMF may be considered deactivated and handover attempt may be terminated for that PDU Session.

At step 8a, the SMF may send to the T-UPF (intermediate) an N4 Session Modification Request.

If a new T-UPF is inserted or an existing intermediate S-UPF is re-allocated, the SMF may send N4 Session Modification Request indicating DL AN Tunnel Info of T-RAN to the T-UPF.

At step 8b, the T-UPF sends to the SMF an N4 Session Modification Response. The T-UPF may acknowledge by sending N4 Session Modification Response message to SMF.

At step 9a, the SMF sends to the S-UPF (intermediate) an N4 Session Modification Request. If UPF is not re-allocated, the SMF may send N4 Session Modification Request indi-cating DL AN Tunnel Info of T-RAN to the S-UPF.

At step 9b, the S-UPF sends to the SMF a N4 Session Modification Response. The S-UPF may acknowledge by sending N4 Session Modification Response message to SMF.

At step 10a, the SMF sends to the UPF (PSA) an N4 Session Modification Request.

For non-roaming or local breakout roaming scenario, the SMF may send N4 Session Modification Request message to PDU Session Anchor UPF, UPF (PSA), providing N3 AN Tunnel Info of T-RAN or the DL CN Tunnel Info of T-UPF if a new T-UPF is inserted or an existing intermediate S-UPF is re-allocated. If the existing intermediate S-UPF terminating to N9 toward the H-UPF (PDU Session Anchor) is re-allocated for the home routed roaming scenario, the V-SMF may invoke an Nsmf_PDUSession_Update Request service operation toward the H-SMF.

In case of the S-UPF acts as a UL CL or BP, the SMF may indicate only one of the PDU Session Anchors to send the "end marker" packets. To ensure the "end marker" is the last user plane packet on the old path, the SMF may modify the path on other PDU Session Anchors before it indicates the PDU Session Anchor to send the "end marker" packets.

If T-UPF is not inserted or an existing intermediate S-UPF not re-allocated, step 10a and step 10b may be skipped.

At step 10b, the UPF (PSA) sends to the SMF an N4 Session Modification Response. In order to assist the reordering function in the T-RAN, the UPF (PSA) may send one or more "end marker" packets for each N3 tunnel on the old path immediately after switching the path, the source NG-RAN may forward the "end marker" packets to the target NG-RAN. At this point, UPF (PSA) may start sending downlink packets to the T-RAN, via T-UPF if a new TUPF is inserted or an existing intermediate S-UPF is re-allocated. In case of home routed roaming scenario, the H-SMF may respond with the Nsmf_PDUSession_Update Response service operation to V-SMF once the H-UPF (PDU Session Anchor) is updated with the UL Tunnel Info of the T-UPF.

When there are multiple UPFs (PSA), step 10a and step 10b may be performed for each UPFs (PSA).

At step 11, the SMF sends to the T-AMF an Nsmf_P-DUSession_UpdateSMContext Response. The response may comprise a PDU Session ID. The SMF may confirm reception of Handover Complete.

At step 12, the UE initiates Mobility Registration Update procedure. The target AMF may know that it is a Handover procedure and therefore the target AMF may perform only a subset of the Registration procedure.

At step 13a, the SMF sends to the S-UPF (intermediate) an N4 Session Release Request. If there is a source intermediate UPF, the SMF may initiate resource release, after timer in step 6 or indirect data forwarding timer expires, by sending an N4 Session Release Request (Release Cause) to source UPF. This message may also be used to release the indirect data forwarding resource in S-UPF.

At step 13b, the S-UPF sends to the SMF an N4 Session Release Response. The S-UPF may acknowledge with an N4 Session Release Response message to confirm the release of resources. In case of indirect data forwarding, the resource of indirect data forwarding may also be released.

At step 14a, the AMF sends to the S-RAN a UE Context Release Command. The AMF may send the UE Context Release Command after the timer in step 6a expires.

At step 14b, the S-RAN sends to the AMF a UE Context Release Complete. The source NG-RAN may release its resources related to the UE and respond with a UE Context Release Complete message.

At step 15a, the SMF sends to the T-UPF an N4 Session Modification Request. If indirect forwarding applies and UPF is re-allocated, after timer of indirect data forwarding expires, the SMF may send the N4 Session Modification Request to T-UPF to release the indirect data forwarding resource.

At step 15b, the T-UPF sends to the SMF an N4 Session Modification Response. The T-UPF may acknowledge with the N4 Session Modification Response message to confirm the release of indirect data forwarding resources.

However the process described above in relation to FIGS. 5 and 6 may not be efficient with respect to handover of the UE in connected mode from one PLMN to another PLMN when there is no change in the serving RAN (for example a satellite node B, or sNB) but there is change in 5GC. This may be particularly relevant to the case where the UE is served by a satellite beam which overlaps several countries, as described previously.

Some embodiments may address the problem of how to ensure service continuity/procedure optimization during handover of the UE in connected mode from one PLMN to another PLMN when there is no change in the serving RAN (sNB) but there is change in 5GC. Some embodiments may adapt the handover preparation phase process shown in FIGS. 5A and 5B and/or the handover execution phase process shown in FIGS. 6A and 6B to overcome this problem.

Reference is made to FIGS. 9A-9E, which shows a method according to some examples.

Reference is first made to FIG. 9A, which shows a method which in some examples may be perform by a first access and mobility management function.

At step 900, a method comprises determining, by a first access and mobility management function in a first network, that handover of a user equipment from the first access and mobility management function to a second access and mobility management function in a second network is required.

At step 902, the method comprises sending, to the second access and mobility management function, a context update request for the user equipment, wherein the context update request comprises an indication that the source and target access node are the same.

At step 904, the method comprises receiving, from the second access and mobility management function, a context update response based on the context update request, the context update response comprising the indication that the source and target access node are the same.

Reference is made to FIG. 9B, which shows a method which in some examples may be perform by a second access and mobility management function.

At step 906, the method comprises receiving, at a second access and mobility management function in a second network from a first access and mobility management function in a first network, a context update request for a user equipment served by the first access and mobility management function, wherein the context update request comprises an indication that the source and target access node are the same.

At step 908, the method comprises selecting, based on the context update request, a user plane function in the second network to serve the user equipment.

At step 910, the method comprises responsive to selecting the user plane function, sending, to the first access and mobility management function, a context update response, the context update response comprising the indication that the source and target access node are the same.

Reference is made to FIG. 9C, which shows a method which in some examples may be performed by a first access and mobility management function.

At step 912, the method comprises sending, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same.

Reference is made to FIG. 9D, which shows a method which in some examples may be performed by an access node, such as a sNB.

At step 914, the method comprises receiving, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same.

At step 916, the method comprises reconfiguring the user equipment based on the received handover command.

At step 918, the method comprises sending, to the second access and mobility management function, a notification that handover is to be performed.

Reference is made to FIG. 9E, which shows a method which in some examples may be performed by a user equipment.

At step 920, the method comprises receiving, at a user equipment from an access node, a radio resource control reconfiguration message comprising an indication of a change in access and mobility management function and no change in access node.

At step 922, the method comprises updating, at the user equipment, configuration information based on the radio resource control reconfiguration message.

At step 924, the method comprises sending, to the access node, a radio resource control reconfiguration complete message indicating that the user equipment has been reconfigured.

In some examples, in the Handover Preparation phase, when compared to handover procedure (as defined in TS 23.502, clause 4.9.1.3 and described above in relation to FIGS. 5A and 5B), inter-gNB signaling, such as "Handover Required", "Handover Request" and "Handover Acknowledgement", may be avoided since this Handover trigger is not from sNB but from AMF.

Furthermore, in some examples, during UE context transfer from source to target AMF, a "same source/target sNB indication" may be included along with source sNB-AMF NGAP ID or handle ID, so that when the target AMF indicates the same to sNB, it exactly knows which UE context is updated to connect with the new target AMF. In addition, in some examples, UE ID allocation, gNB internal resource allocation and RAN-CN signaling (to update the RAN allocated UE ID) can be avoided by retaining the earlier details.

In some examples in the Handover Execution phase, when compared to handover procedure (as defined in TS 23.502, clause 4.9.1.3 as described above in relation to FIGS. 6A and 6B), some examples may avoid the "Handover Confirmation", since source and target sNB is same and it only needs to update the security keys which is delivered to the UE via RRC Reconfiguration procedure.

Thus, some examples may improve the efficiency of the handover process during handover of the UE in connected mode from one PLMN to another PLMN when there is no change in the serving RAN (sNB) but there is change in 5GC.

In the following, it is assumed that:

a) a serving PLMN AMF (S-AMF)/5GC has an interface/connectivity with the AMF/5GC of another PLMN serving a neighboring geographical region (e.g. country) across the border, but is connected to the same sNB/NTN gNB; and b) the serving PLMN/AMF determines the UE position from location management function (LMF) indicating that the UE is currently out of the LMF's PLMN coverage and is camped in the other PLMN area (with the PLMN ID details).

Figure 7:
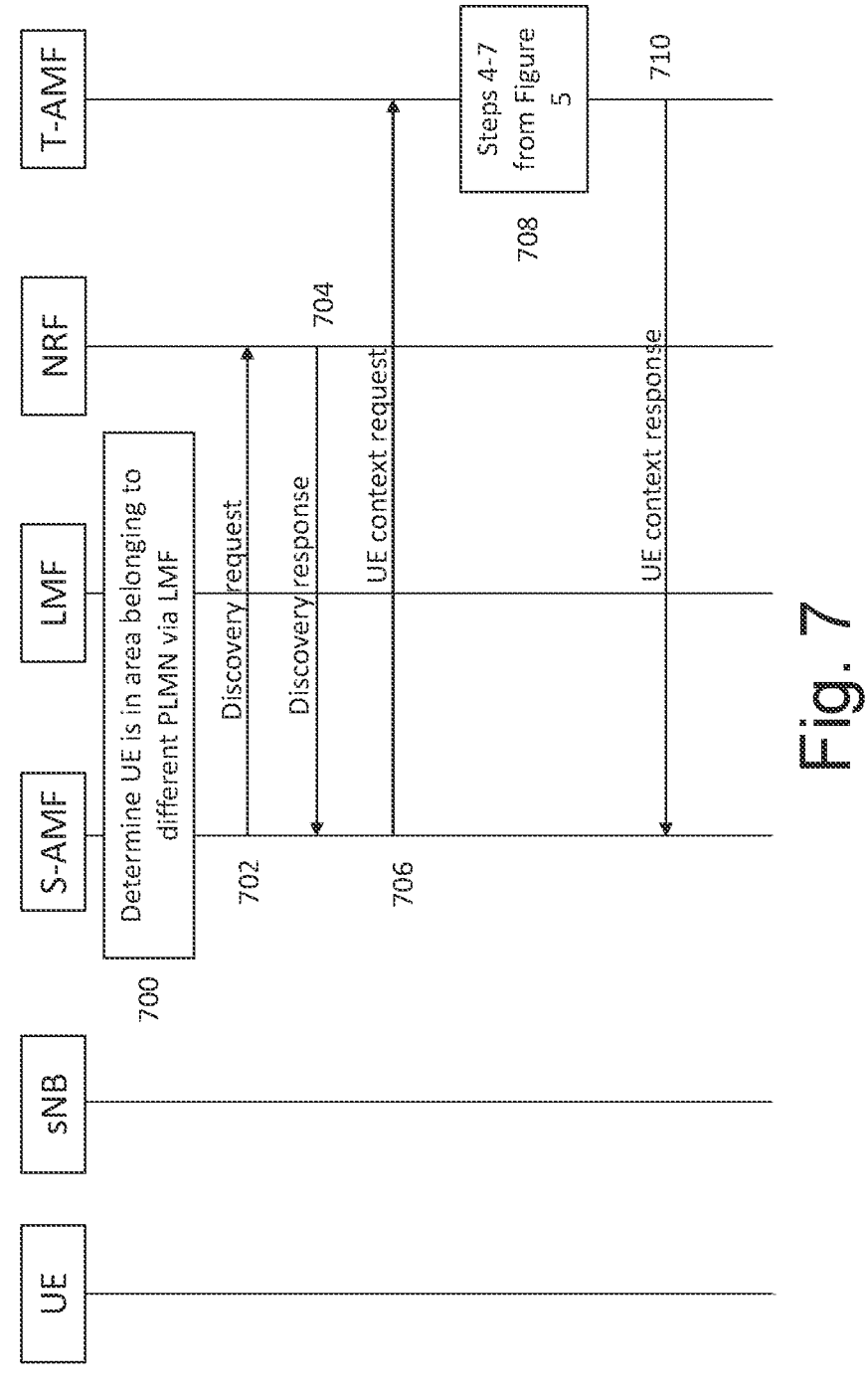
FIG. 7 shows a handover preparation phase according to some examples.

Reference is made to FIG. 7, which shows a method according to some examples. The method of FIG. 7 may represent a modification of the handover preparation phase described in relation to FIGS. 5A and 5B.

At 700, the S-AMF determines that the UE is in an area belonging to a different PLMN. This may for example be based on a registration procedure and validation from the LMF.

At 702, the S-AMF sends a discovery request to the NRF. The discovery request may comprise an Nnrf_NFDiscoveryRequest. The request may comprise a PLMN ID of the PLMN in which the AMF has determined the UE to be located in at step 700.

At 704, based on the request, the NRF sends a discovery response to the S-AMF. The response may comprise address information of the AMF of the PLMN in which the AMF has determined the UE to be located in at step 700—i.e. the T-AMF. For example, the address information may comprise an IP address or FQDN of the T-AMF.

At 706, based on the discovery response, the S-AMF sends a UE context request to the T-AMF.

The UE context request message may comprise a Namf_Communication_CreateUEContext Request. The request may comprise an indication that the source and target sNB are the same. Thus, when the target AMF indicates the same to sNB, the sNB exactly knows which UE context is updated to connect with the new target AMF.

If the T-AMF does not support the indication or will not be able to support the UE, in some examples the T-AMF may send a negative acknowledgement to the S-AMF. In this case, the S-AMF may deregister the UE.

The UE context request may further comprise one or more of: N2 information, such as the sNB ID, for the UE; UE context information; PDU session information; HPLMN S-NSSAIs; and a sNB handle for the UE.

At 708, the T-AMF performs UPF selection and establishes an N4 session for the UE prior to handover. The T-AMF may for example perform steps 4-7 described above in relation to FIGS. 5A and 5B.

At 710, having completed the steps at 708, the T-AMF sends a UE context response to the S-AMF. The UE context response may comprise N2 SM information including the indication that the source and target sNB are the same.

Thus, when compared to handover procedure as defined in TS 23.502, clause 4.9.1.3 and described previously in relation to FIGS. 5A and 5B, the method of FIG. 7 may achieve optimization by avoiding "Handover Required", "Handover Request" and "Handover Acknowledgement" signalling, since the Handover trigger is not from the sNB but from the AMF (which identifies that the UE is currently in an area belonging to another PLMN based on indication from LMF). This may be achieved by including the indication that the source and target sNB are the same in the UE context request and response.

Figure 8:
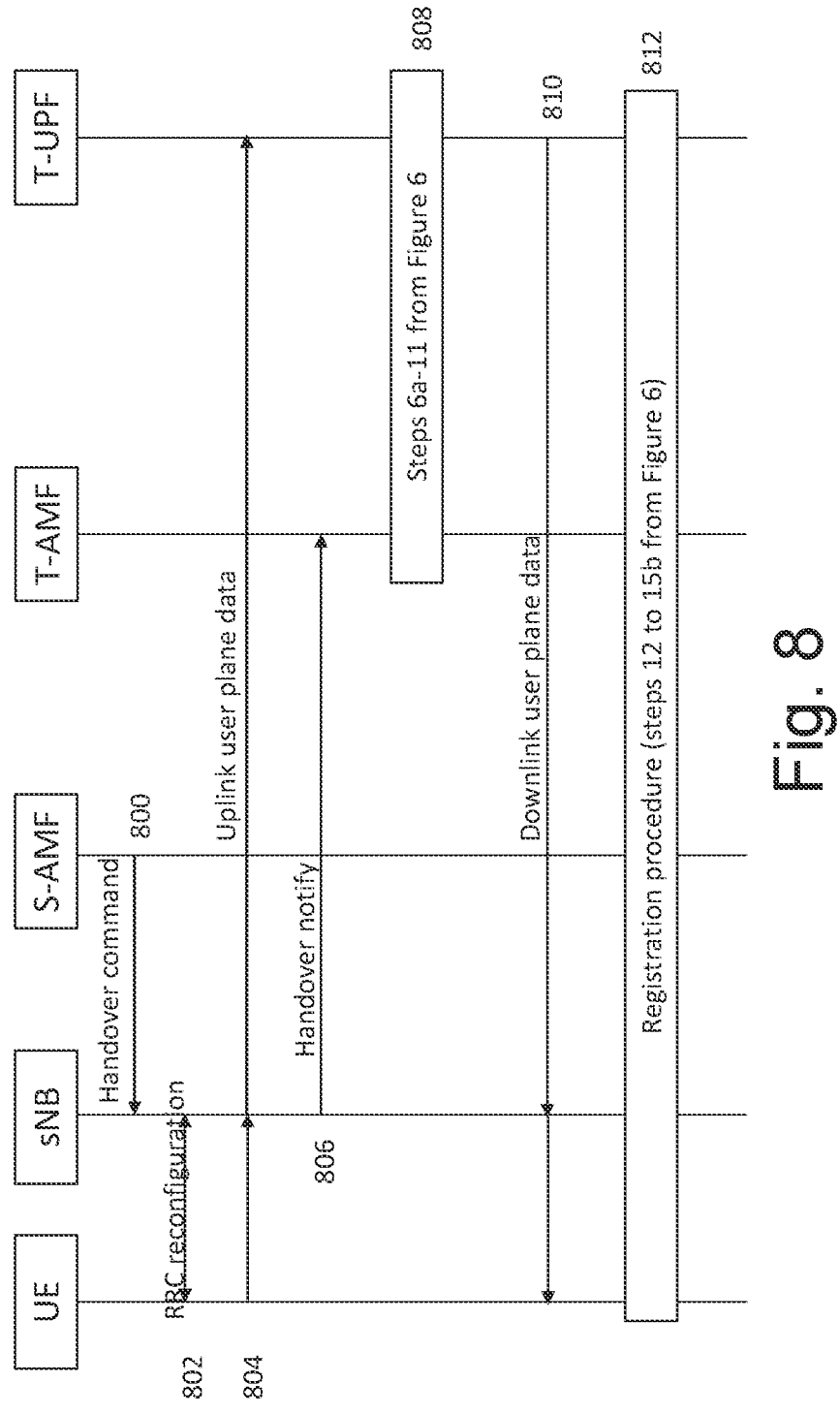
FIG. 8 shows a handover execution phase according to some examples.

Reference is made to FIG. 8, which shows a method according to some examples. The method of FIG. 8 may represent a modification of the handover execution phase described in relation to FIGS. 6A and 6B. It should be understood that execution of the method shown in FIG. 8 may follow execution of the method shown in FIG. 7.

At 800, the S-AMF sends a handover command to the sNB. The handover command comprises an indication that the source and target sNB are the same. The handover command may further comprise an identifier of the T-AMF and N2 SM information. The sending of the handover command may be trigger by receiving an Namf_communication_CreateUEContext Response from the T-AMF.

At 802, the sNB sends an RRC reconfiguration message to the UE, and in response receives an RRC reconfiguration complete message back from the UE. The RRC reconfiguration message may comprise an indication of the identifier of the T-AMF and/or T-UPF, but no change in configuration of sNB.

At 804, uplink user plane data sent from the UE to the sNB is forwarded to the T-UPF.

At 806, the sNB sends a handover notify message to the T-AMF to trigger the execution of handover from the S-AMF to the T-AMF. The handover notify message may be sent in response to successfully completing the RRC reconfiguration procedure.

At 808, the T-AMF and T-UPF perform steps 6a-11 described above in relation to FIGS. 6A and 6B—i.e., the T-AMF and T-UPF establish a PDU session for the UE with the T-UPF and SMF (not shown in FIG. 8).

At 810, after performing step 808, the T-UPF begins providing downlink user plane data to the UE via the sNB.

At 812, the registration procedure proceeds as described in steps 12-15b of FIG. 6B.

Thus, when compared to handover procedure as defined in Ts 23.502, clause 4.9.1.3 and described above in relation to FIGS. 6A and 6B, the method of FIG. 8 may achieve optimization by avoiding "Handover Confirm", since the Handover Command comprises an indication that both source and target sNB is same and indicates the new target AMF.

Furthermore, unlike existing handover procedures where source RAN and target RAN are different and UE needs to synchronize with the target RAN, in some examples since both source and target RAN are same—RAN only needs to update the keys in the UE which is done via RRC Reconfiguration procedure.

After successful handover procedure, registration procedure with AMF (belonging to new PLMN) is completed.

While some examples above have been described in relation to an sNB, it should be understood that in other examples any other type of network access node may be used instead of an sNB. That is to say, while some examples may find particular advantages when applied to an sNB, advantages may also be found, possibly to a lesser extent, when applied to other access node types, such as a gNB.

In some examples, there is provided an apparatus comprising means for determining, by a first access and mobility management function in a first network, that handover of a user equipment from the first access and mobility management function to a second access and mobility management function in a second network is required; sending, to the second access and mobility management function, a context update request for the user equipment, wherein the context update request comprises an indication that the source and target access node are the same; and receiving, from the second access and mobility management function, a context update response based on the context update request, the context update response comprising the indication that the source and target access node are the same.

In some examples, the apparatus may comprise at least one processor and at least one memory including a computer program code, the at least one memory and computer program code configured to, with the at least one processor, cause the apparatus at least to: determine, by a first access and mobility management function in a first network, that handover of a user equipment from the first access and mobility management function to a second access and mobility management function in a second network is required; send, to the second access and mobility management function, a context update request for the user equipment, wherein the context update request comprises an indication that the source and target access node are the same; and receive, from the second access and mobility management function, a context update response based on the context update request, the context update response comprising the indication that the source and target access node are the same In some examples, there is provided an apparatus comprising means for: receiving, at a second access and mobility management function in a second network from a first access and mobility management function in a first network, a context update request for a user equipment served by the first access and mobility management function, wherein the context update request comprises an indication that the source and target access node are the same; selecting, based on the context update request, a user plane function in the second network to serve the user equipment; and responsive to selecting the user plane function, sending, to the first access and mobility management function, a context update response, the context update response comprising the indication that the source and target access node are the same.

In some examples, the apparatus may comprise at least one processor and at least one memory including a computer program code, the at least one memory and computer program code configured to, with the at least one processor, cause the apparatus at least to: receive, at a second access and mobility management function in a second network from a first access and mobility management function in a first network, a context update request for a user equipment served by the first access and mobility management function, wherein the context update request comprises an indication that the source and target access node are the same; select, based on the context update request, a user plane function in the second network to serve the user equipment; and responsive to selecting the user plane function, send, to the first access and mobility management function, a context update response, the context update response comprising the indication that the source and target access node are the same.

In some examples, there is provided an apparatus comprising means for: sending, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same.

In some examples, the apparatus may comprise at least one processor and at least one memory including a computer program code, the at least one memory and computer program code configured to, with the at least one processor, cause the apparatus at least to: send, from a first access and mobility management function of a first network to an access node serving a user equipment, a handover command for causing the handover of the user equipment from the first access and mobility management function to a second access and mobility management function of a second network, wherein the handover command comprises an indication that the source and target access node are the same.

In some examples, there is provided an apparatus comprising means for: receiving, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same; reconfiguring the user equipment based on the received handover command; and sending, to the second access and mobility management function, a notification that handover is to be performed.

In some examples, the apparatus may comprise at least one processor and at least one memory including a computer program code, the at least one memory and computer program code configured to, with the at least one processor, cause the apparatus at least to: receive, from a first access and mobility management function of a first network at an access node serving a user equipment, a handover command for causing the handover of the user equipment from the first access and mobility management function of a first network to a second access and mobility management function of a second network, wherein the handover command comprises an indication that the source and target access node are the same; reconfigure the user equipment based on the received handover command; and send, to the second access and mobility management function, a notification that handover is to be performed.

In some examples, there is provided an apparatus comprising means for: receiving, at a user equipment from an access node, a radio resource control reconfiguration message comprising an indication of a change in access and mobility management function and no change in access node; updating, at the user equipment, configuration information based on the radio resource control reconfiguration message; and sending, to the access node, a radio resource control reconfiguration complete message indicating that the user equipment has been reconfigured.

In some examples, the apparatus may comprise at least one processor and at least one memory including a computer program code, the at least one memory and computer program code configured to, with the at least one processor, cause the apparatus at least to: receive, at a user equipment from an access node, a radio resource control reconfiguration message comprising an indication of a change in access and mobility management function and no change in access node; update, at the user equipment, configuration information based on the radio resource control reconfiguration message; and send, to the access node, a radio resource control reconfiguration complete message indicating that the user equipment has been reconfigured.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

We claim:

1. A method comprising:
determining, by a first access and mobility management function of a first public land mobile network serving a user equipment, that the user equipment is in a location or area associated with a second public land mobile network;
determining, by the first access and mobility management function, that handover of the user equipment from the first access and mobility management function to a second access and mobility management function of the second public land mobile network is required;
sending, by the first access and mobility management function to the second access and mobility management function, a request to update a user equipment context for the user equipment, wherein the request comprises an indication that a source access node connected to the first public land mobile network and a target access node connected to the second public land mobile network are a same access node; and
receiving, by the first access and mobility management function from the second access and mobility management function, a response to the request, the response comprising the indication that the source access node and the target access node are the same access node,
wherein the first access and mobility management function is stored in memory of an apparatus of the first public land mobile network; and
wherein the second access and mobility management function is stored in memory of an apparatus of the second public land mobile network.

2. The method of claim 1, further comprising:
obtaining, by the first access and mobility management function, from a network repository function, address information comprising an address of the second access and mobility management function, and wherein the sending comprises sending the request to update the user equipment context to the address of the second access and mobility management function.

3. The method of claim 1, wherein the request to update the user equipment context for the user equipment comprises one or more of the following:
an identifier of the source access node;
user equipment context information for the user equipment;
protocol data unit session (PDU) information indicating one or more PDU sessions of the user equipment;
single network slice assistance information indicating a network slice of the first public land mobile network; or
a handle of the source access node for the user equipment.

4. An apparatus comprising:
at least one processor; and
at least one memory storing instructions of a first access and mobility management function of a first public land mobile network, wherein the instructions, when executed by the at least one processor, cause the apparatus to perform operations, the operations comprising:
determining that a user equipment served by the first access and mobility function is in a location or area associated with a second public land mobile network;
determining that handover of the user equipment from the first access and mobility management function to a second access and mobility management function of the second public land mobile network is required;
sending a request to update a user equipment context for the user equipment, wherein the request comprises an indication that a source access node connected to the first public land mobile network and a target access node connected to the second public land mobile network are a same access node; and
receiving a response to the request, the response comprising the indication that the source access node and the target access node are the same access node.

5. The apparatus of claim 4, wherein the operations further comprise:
obtaining from a network repository function, address information comprising an address of the second access and mobility management function, and wherein the sending comprises sending the request to update the user equipment context to the address of the second access and mobility management function.

6. The apparatus of claim 4, wherein the request to update the user equipment context for the user equipment comprises one or more of the following:

an identifier of the source access node;

user equipment context information for the user equipment;

protocol data unit session (PDU) information indicating one or more PDU sessions of the user equipment;

single network slice assistance information indicating a network slice of the first public land mobile network; or a handle of the source access node for the user equipment.

7. A method comprising:

determining, by a first public land mobile network serving a user equipment, that the user equipment is in a location or area associated with a second public land mobile network;

determining, by the first public land mobile network, that handover of the user equipment from a first access and mobility management function to a second access and mobility management function of the second public land mobile network is required;

sending, by the first public land mobile network to the second public land mobile network, a request to update a user equipment context for the user equipment, wherein the request comprises an indication that a source access node connected to the first public land mobile network and a target access node connected to the second public land mobile network are a same access node; and receiving, by the first public land mobile network from the second public land mobile network, a response to the request, the response comprising the indication that the source access node and the target access node are the same access node.

8. The method of claim 7, further comprising:

obtaining, by the first access and mobility management function, from a network repository function, address information comprising an address of the second access and mobility management function, and wherein the sending comprises sending the request to update the user equipment context to the address of the second access and mobility management function.

9. The method of claim 7, wherein the request to update the user equipment context for the user equipment comprises one or more of the following:

an identifier of the source access node;

user equipment context information for the user equipment;

protocol data unit session (PDU) information indicating one or more PDU sessions of the user equipment;

single network slice assistance information indicating a network slice of the first public land mobile network; or a handle of the source access node for the user equipment.

* * * * *